Feb. 2, 1965

F. W. SCHMIDLIN ETAL 3,168,727

SUPERCONDUCTIVE STORAGE CIRCUIT WITH PERSISTENT CIRCULATING CURRENT

Filed Feb. 23, 1960

3 Sheets-Sheet 1

FRED W. SCHMIDLIN
ARTHUR J. LEARN
RUEBEN S. SPRIGGS
*INVENTORS.*

BY Jerry A. Dinardo
AGENT

FRED W. SCHMIDLIN
ARTHUR J. LEARN
RUEBEN S. SPRIGGS
*INVENTORS*

*BY* Jerry A. Durando
AGENT

FRED W. SCHMIDLIN
ARTHUR J. LEARN
RUEBEN S. SPRIGGS
*INVENTORS.*

BY Jerry A. Dinardo
AGENT 3,168,727

SUPERCONDUCTIVE STORAGE CIRCUIT WITH PERSISTENT CIRCULATING CURRENT

Frederick W. Schmidlin, Redondo Beach, Arthur J. Learn, Inglewood, and Rueben S. Spriggs, Manhattan Beach, Calif., assignors, by mesne assignments, to Thompson Ramo Wooldridge Inc., Cleveland, Ohio, a corporation of Ohio Filed Feb. 23, 1960, Ser. No. 10,213
8 Claims. (Cl. 340—173.1)

This invention relates to information handling arrangements, and has especial utility in connection with amplifiers and storage devices of the kind employing superconductive elements.

In the investigation of the electrical properties of materials at very low temperatures it has been found that the electrical resistance of many materials drops abruptly as the temperature is lowered to that close to absolute zero (zero degrees Kelvin)—the material in such a state being termed superconducting. That the electrical resistance of a material in a superconducting state is actually zero, or so close to it as to be undetectable by measurement, has been well illustrated by experiments at the Massachusetts Institute of Technology where a relatively large current, induced in a lead ring maintained in a superconducting state, continued to flow without any detectable decay for a period of over two years. It is also known that a transition from a superconducting to a resistive state con be induced in a superconductor by applying a magnetic field to the superconductor. The magnetic field can be applied externally to the superconductor, or it can be induced internally by the flow of electric current through the superconductor. In the presence of an external magnetic field, a superconductor requires less directly applied electric current, termed the critical current, to cause a transition than it does when there is no external magnetic field present.

The ability of a superconductor to change its state between the superconducting and the normal, or resistive states has been utilized in various superconductive computer arrangements, such as gating devices and memory circuits, to perform many of the computer functions which, until recently, were carried out exclusively by more bulky and complicated non-superconducting circuit components. While the promise of superconducting computer arrangements is due in a large measure to their relatively small size and simplicity in construction, their more widespread use can be hastened considerably by the further miniaturization and simplification of circuit elements.

Accordingly, it is a principal object of this invention to provide a novel superconductive computer member that is characterized by its relative compactness in size and simplicity of construction.

A further object is to provide a novel storage device utilizing the dual superconductive characteristics of a single superconductive member.

The foregoing and other objects are realized according to the invention through the use of novel arrangements of superconductive elements and circuits which are endowed with plural superconductive characteristics. The plural superconductive characteristics of these superconductive arrangements are utilized in various forms to perform such functions as storage and amplification of electrical signal information. In one embodiment a novel superconductive member is formed with at least two integral elongated portions, with each portion disposed in contiguous adjacency along the length of the other portion. The two portions are formed with substantially different thickness dimensions, with the difference in thickness serving to provide one of the portions (the thinner one) with a substantially greater susceptibility to change from superconductive-to-resistive state than that of the other portion (the thicker one). Accordingly, such a member can have its thin portion transformed from the superconductive to the resistive state by the application to the member of a level of electric current that is insufficient to transform the thick portion. When such a partial transformation in the state of the member occurs, the current is constrained to the thick, untransformed portion. When this occurs, the current is reduced in the thin portion to the point where its outer edges revert to the superconducting state. Upon termination of the applied current, a portion of the current reverses through the outer edges of the thin portion, thus establishing a persistent, stored current in a circuit composed of two superconducting portions.

In accordance with specific embodiments of the invention, the presence of the stored current is sensed by noting the change in state of the superconductive sensing element positioned within the influence of the magnetic field associated with the stored current.

In the three sheets of drawings, wherein like reference characters designate like parts;

Figures 1, 2, 3, 4:
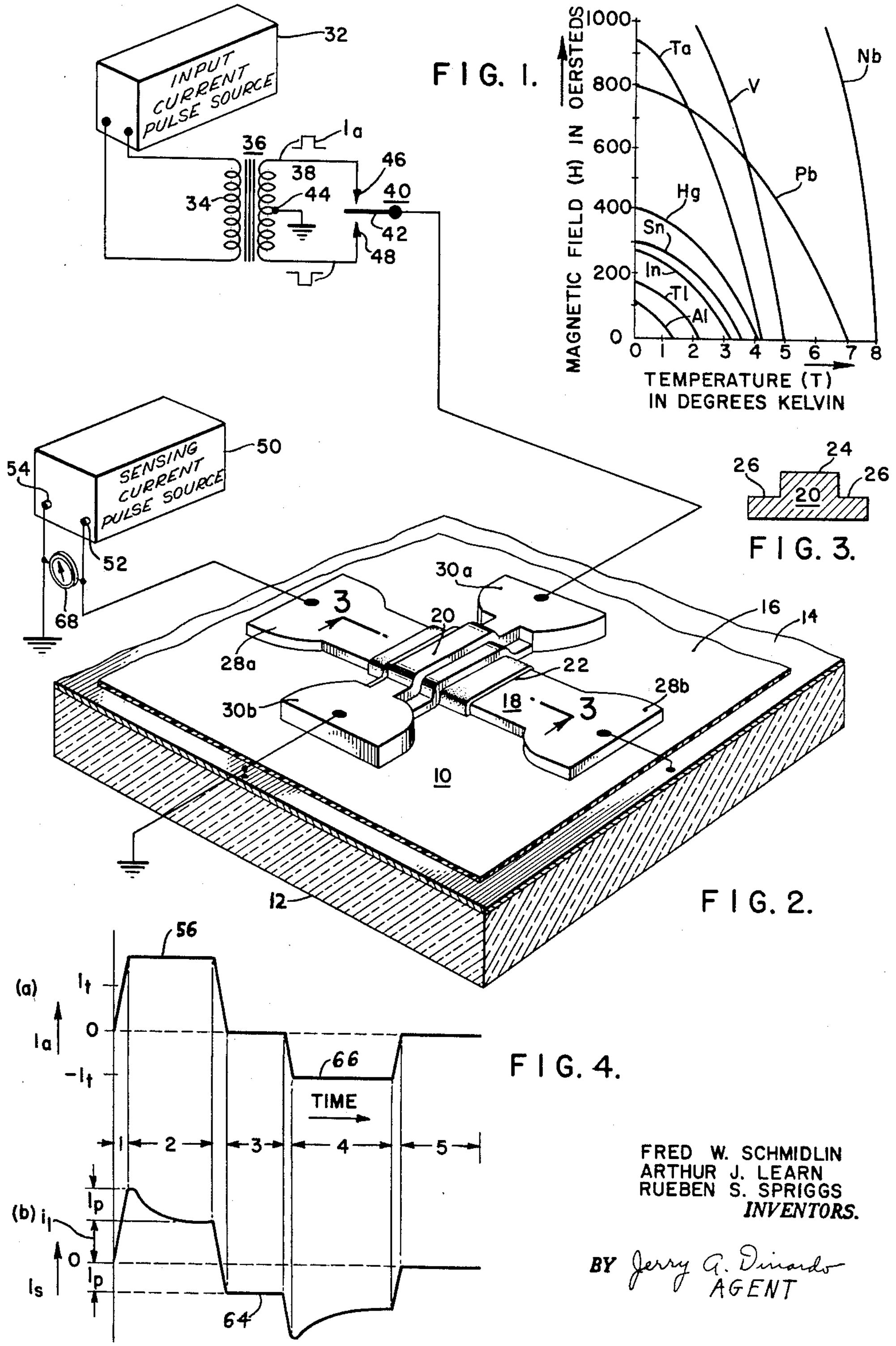
FIG. 1 is a graph illustrating the variation in transition temperatures for various materials as a function of the magnetic field to which they are subjected.
FIG. 2 is a partial perspective view, partly diagrammatic and partly schematic, of one form of a superconductive storage arrangement according to the invention.
FIG. 3 is a sectional view taken along line 3—3 of FIG. 2.
Figure 12:
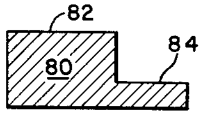
Figure 13:
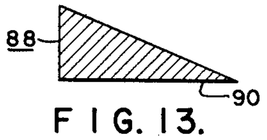
Figure 9:
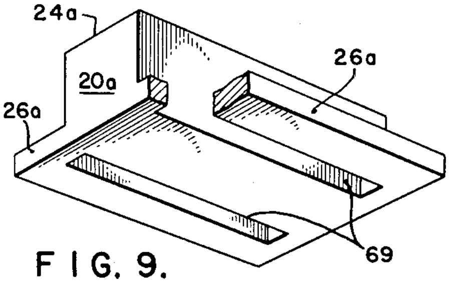
Figure 10:
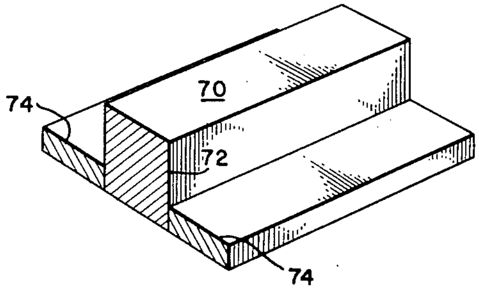
Figures 11, 14:
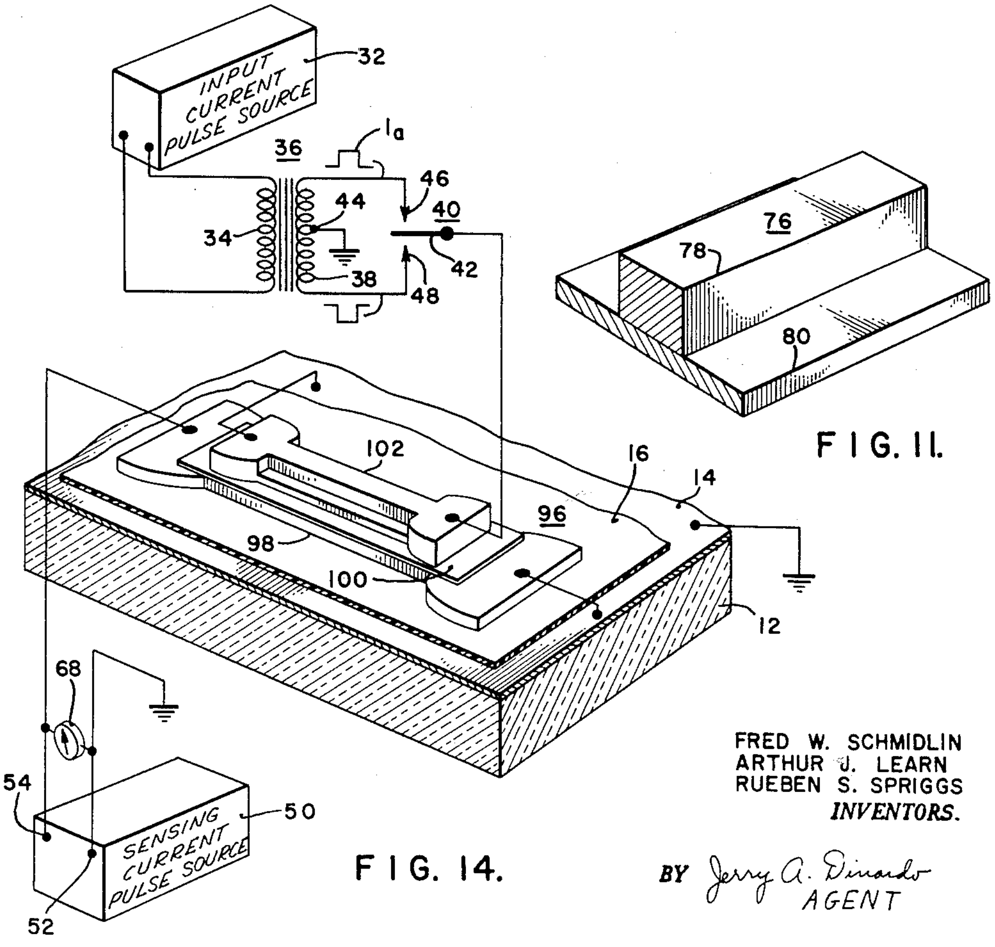

FIGS. 4*a* and 4*b* are graphs of current waveforms useful in describing the operation of the storage arrangement of FIG. 2;

FIGS. 5*a* through 8 are diagrammatic views of the superconductive storage member shown in the arrangement of FIG. 2, illustrating the operation thereof;

FIGS. 9 to 11 are perspective views illustrating modifications of the storage member of the invention;

FIGS. 12 and 13 are sectional views of still further modifications of the storage member of the invention; and FIG. 14 is a perspective view illustrating a modification of the storage arrangement of the invention.

Since the arrangement of the invention is predicated upon certain effects peculiar to the phenomena of superconductivity, these effects will be discussed prior to a discussion of embodiments of the invention.

*Superconductive phenomena*

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconductive state, is called the transition temperature. For example, the following materials have transition temperatures, and become superconductive, as noted:

| | ° Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

Only a few of the materials exhibiting the phenomenon of superconductivity are listed above. Other elements, and many alloys and compounds, become superconductive at temperatures ranging between 0° and around 20° Kelvin. A discussion of many such materials may be found in a book entitled "Superconductivity" by D. Schoenberg, Cambridge University Press, Cambridge, England, 1952.

The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled "Magnetically Controlled Gating Element," granted to Dudley A. Buck.

In addition, the above-listed transition temperatures apply only in the absence of electrical current through the material. With a current through a superconductive material, the transition temperature of the material is decreased. In such a case the material may be in an electrically resistive state even though the temperature of the material is lower than the normal transition temperature. The action of a current in lowering the temperature at which the tansition occurs (from a state of normal electrical resistivity to one of superconductivity) is similar to the lowering of the transition temperature by an external magnetic field, inasmuch as a magnetic field is associated with a current.

Accordingly, when a material is held at a temperature below its normal transition temperature for a zero magnetic field, and is thus in a superconducing state, the superconducting condition of the material may be extinguished by the application of an external magnetic field or by passing an electric current through the material.

FIG. 1 illustrates the variation in transition temperatures (T) for several materials as a function of an applied magnetic field. In the absence of a magnetic field, the point at which each of the several curves intercepts the abscissa is the transition temperature at which the material becomes superconducting. (The transition temperature for each material varies almost parabolically with the magnetic field applied to it, as expressed by the function $$\frac{H_c}{H_o}=1-\left(\frac{T}{T_c}\right)^2$$

where $H_c$ is the critical magnetic field density for effecting a transition from the superconducting to the resistive state at any given temperature T, $H_o$ is the intercept of a curve on the ordinate axis, at zero degrees Kelvin, and $T_c$ is the transition temperature of the material in the absence of a magnetic field.) The transition temperature is given in degrees Kelvin. A particular material is superconducting for values of temperature and magnetic field falling beneath each of the several curves, while for values of temperature and magnetic field falling above a curve, the material possesses electrical resistance.

Since a current in the material has an effect upon the transition temperature that is similar to the effect of a magnetic field, the passage of a current through superconducting materials will yield curves similar to those shown in FIG. 1.

*Information handling arrangement*

One form of an information storage arrangement according to the invention is shown in FIG. 2. A memory cell 10, shown greatly enlarged for the sake of clarity, includes an insulating substrate 12 of glass, for example, supporting a conductive ground plane coating 14. The coating 14 is preferably made of a superconductive material, such as lead or niobium, that has a much higher transition temperature relative to the operating temperature of the memory cell 10, so that it will remain superconducting throughout the cell operation. The ground plane coating 14 is covered with an insulation coating 16, except for peripheral portions of the coating 14 which remain uncoated to facilitate the making of electrical connections to a common or ground potential.

A pair of elongated thin film superconductive elements 18 and 20 are disposed on the insulation coating 16 with their long axes extending across the coating 16 in mutually perpendicular directions. The two elements 18 and 20 are insulated from each other at their cross-over points by a thin insulation film 22.

The first element 18, hereinafter called a sensing element, is uniform in thickness along its entire extent. However the other element 20, hereinafter the storage member, as is seen in FIG. 2 and in more detail in FIG. 3, is formed with a central portion 24 that is substantially thicker than its two side portions 26. The sensing element 18 is provided with a pair of widened tabs or terminals 28*a* and 28*b*, one tab at each end. Similarly the storage member 20 is also provided with a pair of tabs 30*a* and 30*b* .

The storage member 20 is adapted to receive energizing current pulses of either positive or negative polarity from an input current pulse source 32. For this purpose the output of the source 32 is connected to the primary winding 34 of a transformer 36. The secondary winding 38 of the transformer 36 is connected in series with a single pole, double throw switch 40, the movable arm 42 of which is connected to one end of the storage member 20 (tab 30*a*). The other end of the storage member (tab 30*b*) is electrically connected to a center tap 44 in the secondary winding through a common ground connection, tab 30*b* being connected to the ground plane and coating 14, and both the ground plane coating 14 and the center tap 44 being grounded. When the movable switch arm 42 engages one switch contact 46, the pulses fed to the storage member 20 have a positive polarity, and when the switch arm 42 engages the other contact 48, the pulses fed to the storage member 20 have a negative polarity.

The sensing element 18 is adapted to receive sensing current pulses of a single polarity from a sensing current pulse source 50. For this purpose one output terminal 52 of the sensing current pulse source 50 is connected to one end (tab 28*a*) of the sensing element 18. The other output terminal 54 of the source 50 and the other end (tab 28*b*) of the sensing element 18 are grounded to complete the circuit, with the tab 28*b* being connected to the ground plane coating 14.

The sensing element 18 is made from a superconductive material that has a substantially lower transition temperature than the material of the memory element 20 so that it may be readily made resistive by the magnetic field produced by persisting currents in the storage member. When the storage member 20 is made of lead or niobium, for example, suitable materials for the sensing element 18 are tin or indium; or for a storage member made of tin, the sensing element may be made of indium. Both the insulation coating 16 and the insulation film 22 may be made of silicon monoxide.

In accordance with the invention, the storage member 20 is endowed with a dual superconductive response characteristic. That is, the thin portions 26 have a substantially greater susceptibility to being transformed from the superconducting to the resistive state than the thick central portion 24. The change in state may be induced through internally generated magnetic fields caused by current flow directly applied to the storage member 20 or by externally applied magnetic fields, as previously discussed. The characteristics of the storage member are adjusted through proper design of the thick and thin portions 24 and 26, such as by thickness proportionment and/or choice of different materials for the portions 24 and 26, so that the thick central portion 24 remains superconducting and unaffected during the application of current flow to the storage member 20, but the two side portions are capable of change in state during the same application of current flow. For example, it has been determined that a higher level of current (critical switching current) is required to transform a thick superconductive film than is required to transform a thinner superconductive film, with the critical current varying non-linearly, at a decreasing rate, with increasing thickness. Also, the critical current varies linearly with the width of the film. Thus, the relative thickness of the central and side portions 24 and 26, respectively, can be adjusted with relation to the level of input current applied to the storage member 20 so that the thin side portions 26 will transform but the thick central portion 24 will not transform. Furthermore, if the thickness of the side portions 24 and 26 is limited to a value at or below a certain critical amount (which for indium and tin is .25 micron) the switching speed of the storage member 24 can be reduced to a very low value of the order of a millimicrosecond. In such cases the thickness of the central portion 24 should be substantially greater than .25 micron. A general discussion of some of the principles underlying the critical film thickness used in the devices of this invention is had in a copending application of John N. Cooper and Eugene C. Crittenden, Jr., filed concurrently with this application, Serial No. 10,495, filed Feb. 23, 1960, and entitled "Electrical Device." The ground plane coating 14, by serving as an electromagnetic shield between two or more neighboring memory cells 10 disposed on the same substrate 12, reduces the inductance of the storage member 20 and also assists in increasing the switching speed of the memory element 20.

The operation of the storage arrangement will now be described with the aid of FIGS. 4*a* and 4*b* (which are waveforms of, respectively, the pulse current applied to the storage member 20, and the current flowing in each of the thin side portions 26) and FIGS. 5*a* through 8 (which are diagrams depicting the distribution of current and magnetic field in the storage member 20).

First assume that a current pulse $I_a$ of desired polarity is applied to the storage member 20. The applied pulse $I_a$ is shown in FIG. 4*a* as a positive going pulse 56. Also, assume that the magnitude of the pulse 56 is greater than the threshold current level ($I_t$), that is, a level of current which causes at least some penetration of magnetic flux in the thin side portions 26. This threshold current level ($I_t$) is to be distinguished from the critical switching current value at which a thin film superconductive element transforms in its entirety. By way of explanation, it is known that a material in the superconductive state is virtually unpenetrable by a magnetic field. When current is applied to a thin film superconductive element of uniform thickness, however, a magnetic field is created around the thin film, with a concentration or higher density of flux occurring at the edges of the film. As a result, the flux may penetrate and transform the edges of the thin film at some low current level without penetrating and transforming the intermediate portions of the film. This low level of current, the threshold current level ($I_t$), may be substantially smaller than the critical switching current required to transform the entire film.

Figure 5A:
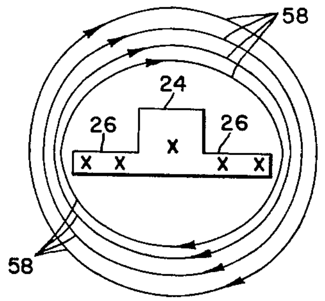
Figure 5B:
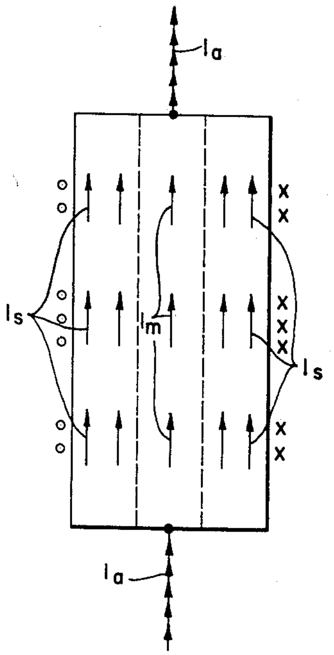

Accordingly, during the initial rise of the applied current $I_a$, corresponding to time interval (1) in FIG. 4*a*, current will flow in all the portions 24 and 26 of the storage member 20, there being a higher concentration of current ($I_s$) in the side portions 26 relative to the current ($I_m$) in the central portion 24. Therefore, the highest concentration of magnetic flux, indicated by arrows 58 in FIG. 5*a*, occurs at the extremities of the thin side portions 26. As long as the storage member 20 remains superconducting no magnetic flux can penetrate any part of the element. FIGS. 5*a* and 5*b* show the current and magnetic flux distributions prevailing at the end of time interval (1). It will be noted that the magnitude of the applied current $I_a$ is indicated by five arrows, of which two are distributed in each of the side portions 26 and one in the central portion 24 to indicate a higher distribution of current ($I_s$) in the side portions 26 relative to the current ($I_m$) in the central portion 24. It will also be assumed that although the applied current $I_a$ will have exceeded the threshold current $I_t$ during time interval (1), the side portions 26 will not have transformed, due to an inherent lag in the superconductive material.

Figure 6A:
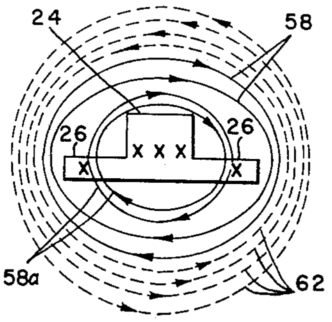
Figure 7A:
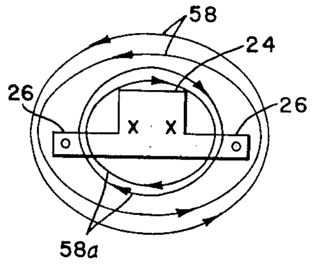
Figure 6B:
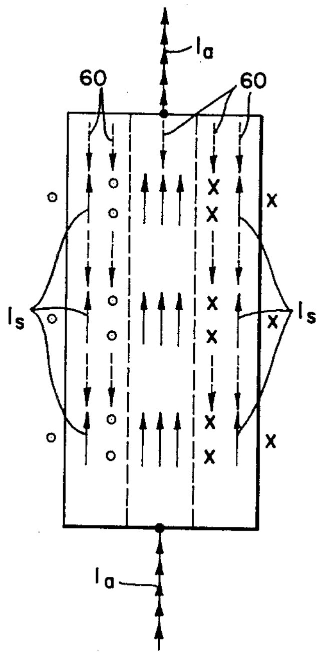
Figure 7B:
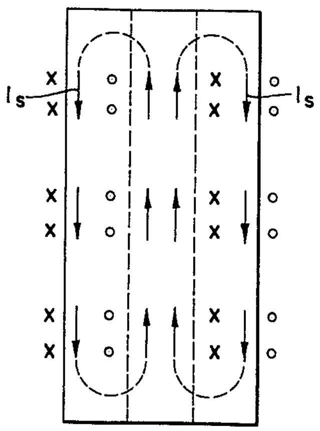
Figure 8:
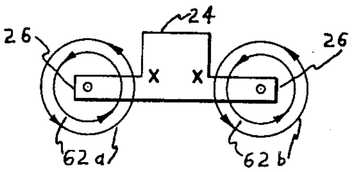

During time interval (2) however, a current in excess of the threshold current $I_t$ will have been flowing long enough to cause the side portions 26 to transform to the resistive state and to cause some of the magnetic flux 58*a* to penetrate the side portions (FIG. 6*a*). When this occurs, more current is constrained to flow in the still superconducting central portion 24 than in the resistive side portions 26, as shown in FIG. 6*b*. The decay of the current $I_s$ in the side portions 24 during time interval (2) is shown in FIG. 4*b*. When the current $I_s$ in the side portions 26 decays to a critical value $i_1$, the outer extremities of the side portions 26 will revert to the superconducting state. However, the regions next adjacent to the central portion 24, where a concentration of magnetic flux 58*a* occurs, (FIG. 6*a*) will remain resistive. Thus, as shown in FIGS. 6*a* and 6*b*, at the end of time interval (2), the current $I_s$ flowing in the side portions 26 is less than the current $I_m$ in the central portion 24, and the magnetic flux 58*a* surrounding the central portion penetrates through the resistive regions of the side portions 26 adjacent to the central portion 24 but not through the superconducting extremities of the side portions 26.

At the end of time interval (2), the applied current $I_a$ falls to zero. The effect of the termination of the current pulse will be the same as though a current of the same magnitude as the applied pulse were applied to the storage member 20 in a direction opposing the applied current pulse. The oppositely applied current, shown in FIG. 6*b* by the dotted arrows 60 will have substantially the same distribution as that associated with the applied current pulse in FIG. 5*b*, inasmuch as both the central portion 24 and the greater part of the side portions 26 will now be in the superconductive state, whereas the entire storage member 20 was initially superconductive. Similarly, the magnetic flux associated with the oppositely applied current will have a direction opposite that of the initially generated flux, as shown by the dotted arrows 62 in FIG. 6*a*. As a result, the current $I_s$ in the side portions 26 reverses its direction and causes a persistent circulating current to flow in each half of the storage member 20 (shown clockwise in the right hand portion of FIG. 7*b* and counterclockwise in the left hand portion). Coincidentally, the magnetic flux 58 exteriorly of the storage member 20 reverses its direction (FIG. 7*a*) and merges with the penetrating flux 58*a* surrounding the central portion 24 to produce a storage of flux in both side portions 26 (indicated by the counterclockwise directed arrows 62*a* and 62*b* in FIG. 8). The amount of stored current and stored flux is determined by the amount by which the applied current $I_a$ exceeds the threshold current $I_t$. This is shown in FIG. 4*b*, where a current 64 is stored in the side portions 26 at the termination of the applied current pulse $I_a$, the stored current 64 having a magnitude of the order of $I_p=I_a-I_t$ and a direction opposite that of the initially applied current pulse $I_a$. The maximum amount of stored flux is determined by the relative widths of the central and side portions 24 and 26.

In order to clear the storage member 20 of the stored current and flux, a negative going current pulse 66 is applied (FIG. 4), the pulse 66 having a magnitude equal to the threshold current level $I_t$ and a direction opposite that of the initially applied pulse 56. The negative going pulse 66 will be additive with respect to the stored current 64, thereby driving the thin side portions 26 into the resistive state, following which the previously stored current in the side portions decays until the side portions 26 become superconducting again, in a manner similar to that previously described. This is shown in FIGS. 4*a* and 4*b*, corresponding to the time interval (4). The effect of terminating the pulse 66 is to reduce the current in the side portions 26 to zero, where it remains as indicated by time interval (5).

In general, the applied or setting current pulse $I_a$ should have a magnitude equal to the sum of the magnitudes of the desired stored current $I_p$ and the threshold current $I_t$ of the thin side portions 26. The erasing pulse as described above, should have a magnitude equal to the threshold current level $I_t$ of the thin side portions.

In order to interrogate the state of the storage member 20, a pulse of current can be fed to the sensing element 18 from the sensing current pulse source 50. The state of the sensing element is determined in part by the current passed through it and in part by the flux stored in the storage member 20. By causing a sufficient amount of flux to be stored, however, the effect of the stored flux can be made to override the effect of the sensing current to the extent that the state of the sensing element is effectively determined solely by the stored flux. Hence, in the presence of stored flux, the sensing element 18 will be resistive and the sensing current from the source 50 will cause a voltage drop across the sensing element 18, which can be read on a voltmeter 68 connected across the terminals 52, 54 of the source 50. A zero reading on the voltmeter 68 will indicate that the sensing element 18 is in the superconducting state and thus that no flux is stored in the storage member 20.

For maximum sensitivity, it is preferred that the sensing element 18 be made from a superconductive material that has a smaller critical field than the material of the storage member 20. In fact the memory cell 10 can be designed to have a sensitivity such that a setting current which biases the sensing element resistive will be less than the critical switching current of the sensing element 18. In such a case the memory cell 10 will exhibit current gain and thus can be used as a logic element. Maximum gain will be realized by making the width of the storage member 20 substantially smaller than the width of the sensing element 18, as shown.

Inasmuch as the stored flux follows a path that penetrates through regions of the storage member contiguous to the central portion, it may prove advantageous to omit superconductive material from these regions. FIG. 9 shows a storage member *20a* wherein the thin side portions *26a* are provided with elongated slots 69 adjacent to the central portion *24a*. In addition to confining the regions through which the stored flux passes, the slots 69 provide the more important function of better defining the threshold current level $I_t$.

While it is preferred for ease in fabrication to make the storage member 20 in the form of a single homogeneous body of material and to rely only on the differential thickness of the central and side portions 24 and 26 to achieve the different susceptibilities to change in state, it is appreciated that other constructions may have certain advantages. For example, FIG. 10 shows a storage member 70 that is a composite of two different superconductive materials. The storage member 70 includes a central portion 72 made of a material that has a higher critical field than the material of the two side portions 74. Such a construction will minimize the difference-in-thickness requirements of the portions 72 and 74. A similar construction is shown in FIG. 11 in the form of a storage member 76 having a narrow thick film 78 of a high critical field material superimposed on a substantially wider thin film of a low critical field material. In each of the two storage members 70 and 76, lead or tin may be used for the high critical field material, when the low critical field material is tin or indium, respectively.

While the storage member has been described as having two side portions, such a construction is not an essential feature of the invention. As shown in FIG. 12, for example, a storage member 80 is made with a thick portion 82 and one thin side portion 84.

In the modification shown in FIG. 13, a storage member 88 takes the form of a single tapered superconductive portion or wedge 90 that is tapered in thickness in a direction transverse to the direction of current flow therethrough. In the operation of the tapered storage member 88 an input current pulse is applied having a magnitude that will cause a transformation of only the thinner regions of the wedge 90, while the thicker regions remain unaffected. The volume of the regions transformed can be controlled by adjusting the magnitude of the input pulse.

While it is preferred to arrange the storage and sensing elements perpendicular to each other, as shown in FIG. 2, for minimizing the mutual inductive coupling between the storage and sensing circuits, it may be advantageous to arrange them in other orientations. One example of a parallel orientation is shown in FIG. 14. A memory cell 96 includes a sensing element 98, an insulating film 100 on the sensing element 98 and a storage member 102 on the insulating film 100 and extending parallel to the sensing element. Otherwise, the construction and operation of the apparatus of FIG. 14 is the same as that shown and described in connection with FIG. 2. The orientation of the storage and sensing elements 102 and 98 shown in FIG. 14 endows the sensing element 98 with a higher resistance in its resistive state. This follows from the fact that the entire length of the sensing element is subjected to the influence of the magnetic flux stored in the storage member 102, whereas in the perpendicular construction shown in FIG. 2 only the portions of the sensing element 18 adjacent to the storage member 20 are subjected to the magnetic flux.

From the foregoing it is now apparent that more compact and simplified computer arrangements are realizable through the use of the novel superconductive member of the invention.

What is claimed is:

1. A storage arrangement comprising: a single elongated superconductive thin-film member having two elongated integral portions of substantially different thickness dimensions arranged in side-by-side contact with each other along their entire respective lengths, the thinner portion having a lower critical current than the thicker portion, and means connected to spaced ends of said member to apply a current pulse of magnitude sufficient to transform said thinner portion to the resistive state but insufficient to transform said thicker portion, whereby at the termination of said current pulse, a persistent circulating current flows in said member in opposite directions along the lengths of said two portions.

2. A storage arrangement according to claim 1, wherein said thin film member is homogeneous in material.

3. A storage arrangement according to claim 1, wherein the thinner portion of said thin film member is made of a material having a relatively low critical field, and said thicker portion is made of a material having a relatively high critical field.

4. A storage arrangement according to claim 1, wherein said thin film member comprises a thick central portion disposed between two thinner side portions.

5. A storage arrangement according to claim 1, wherein said thin film member is wedge-shaped in cross section.

6. A storage arrangement according to claim 1, and further including a superconductive sensing means mounted adjacent to said thin film member and responsive to the persistent current flowing in said member.

7. A storage arrangement according to claim 6, wherein said superconductive sensing means comprises a thin film superconductive element extending parallel to said thin film member.

8. A storage arrangement according to claim 6, wherein said superconductive sensing means comprises a thin film superconductive element extending across said thin film member.

References Cited in the file of this patent

UNITED STATES PATENTS

| | | |
|---|---|---|
| 2,924,814 | Simpson | Feb. 9, 1960 |
| 2,949,602 | Crowe | Aug. 16, 1960 |
| 2,958,836 | McMahon | Nov. 1, 1960 |
| 2,977,575 | Hagelbarger et al. | Mar. 28, 1961 |
| 2,983,889 | Green | May 9, 1961 |
| 2,984,825 | Fuller et al. | May 16, 1961 |
| 2,989,714 | Park et al. | June 20, 1961 |
| 2,989,716 | Brennemann et al. | June 20, 1961 |
| 3,001,178 | Buck | Sept. 19, 1961 |
| 3,016,507 | Grant et al. | Jan. 9, 1962 |
| 3,082,408 | Garwin | Mar. 19, 1963 |
| 3,090,023 | Brennemann | May 14, 1963 |

OTHER REFERENCES

Transactions of the Royal Society of Canada, vol. 30, Section III, 1936, pages 13–31, by H. G. Smith et al.

"Superconductivity," by C. W. Hewlett, General Electric Review, June 1946, pages 19–25.

An Analysis of the Operation of a Persistent-Supercurrent Memory Cell, by R. L. Garwin, published in IBM Journal, October 1957, pp. 304–308.

Trapped-Flux Superconducting Memory, by J. W. Crowe, published in IBM Journal, October 1957, pp. 295–301.

"The Persistatron: A Superconducting Memory and Switching Element for Computers," by M. J. Buckingham, published in University of Wisconsin Press in 1958, pp. 229–232.